Oct. 8, 1929.  J. W. EDWARDS  1,731,128
PIPE LIFTING DEVICE
Filed July 11, 1927  3 Sheets-Sheet 1
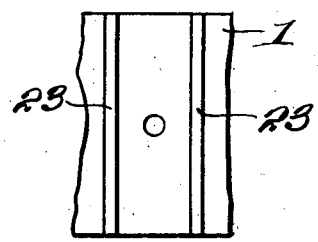
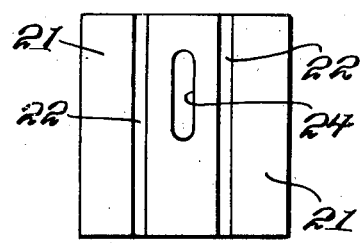
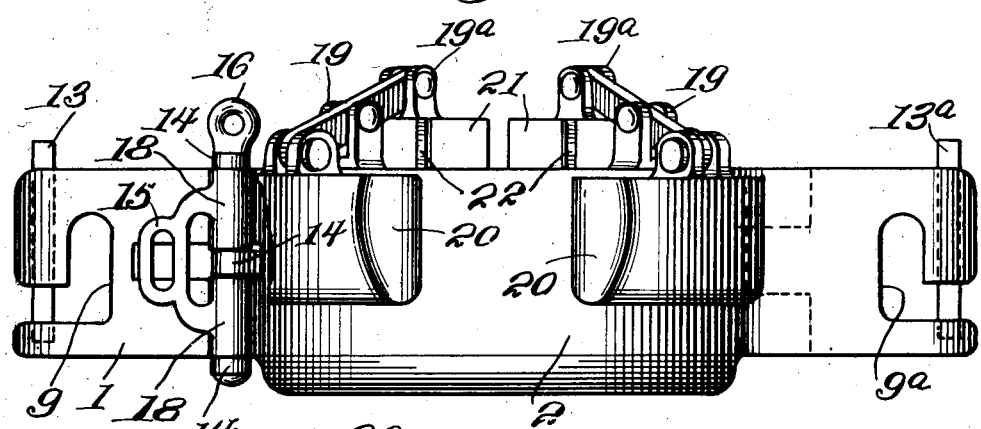
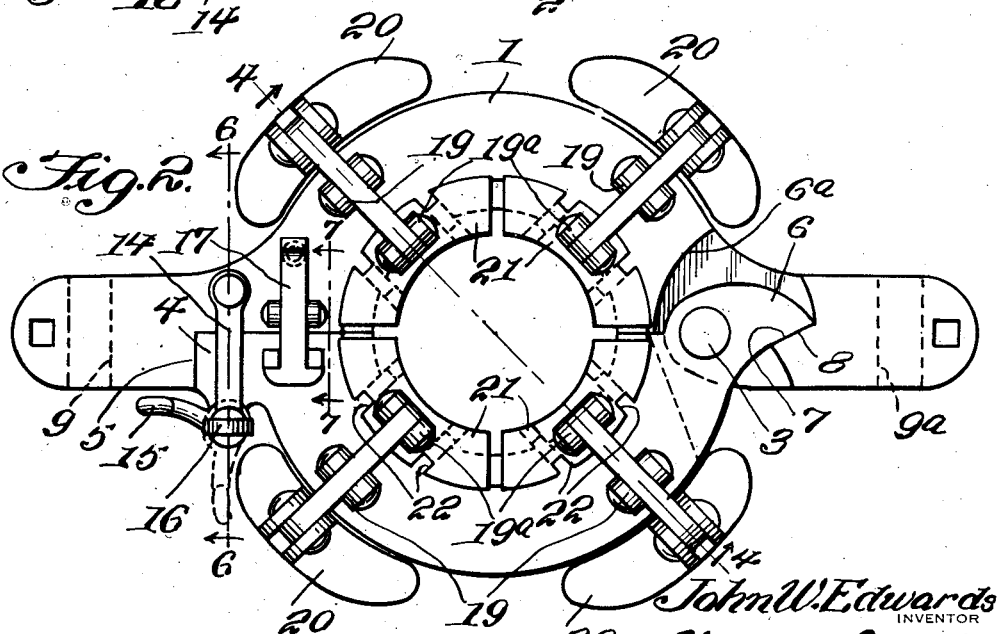
John W. Edwards INVENTOR
BY Victor J. Evans ATTORNEY
WITNESS: J. T. L. Wright

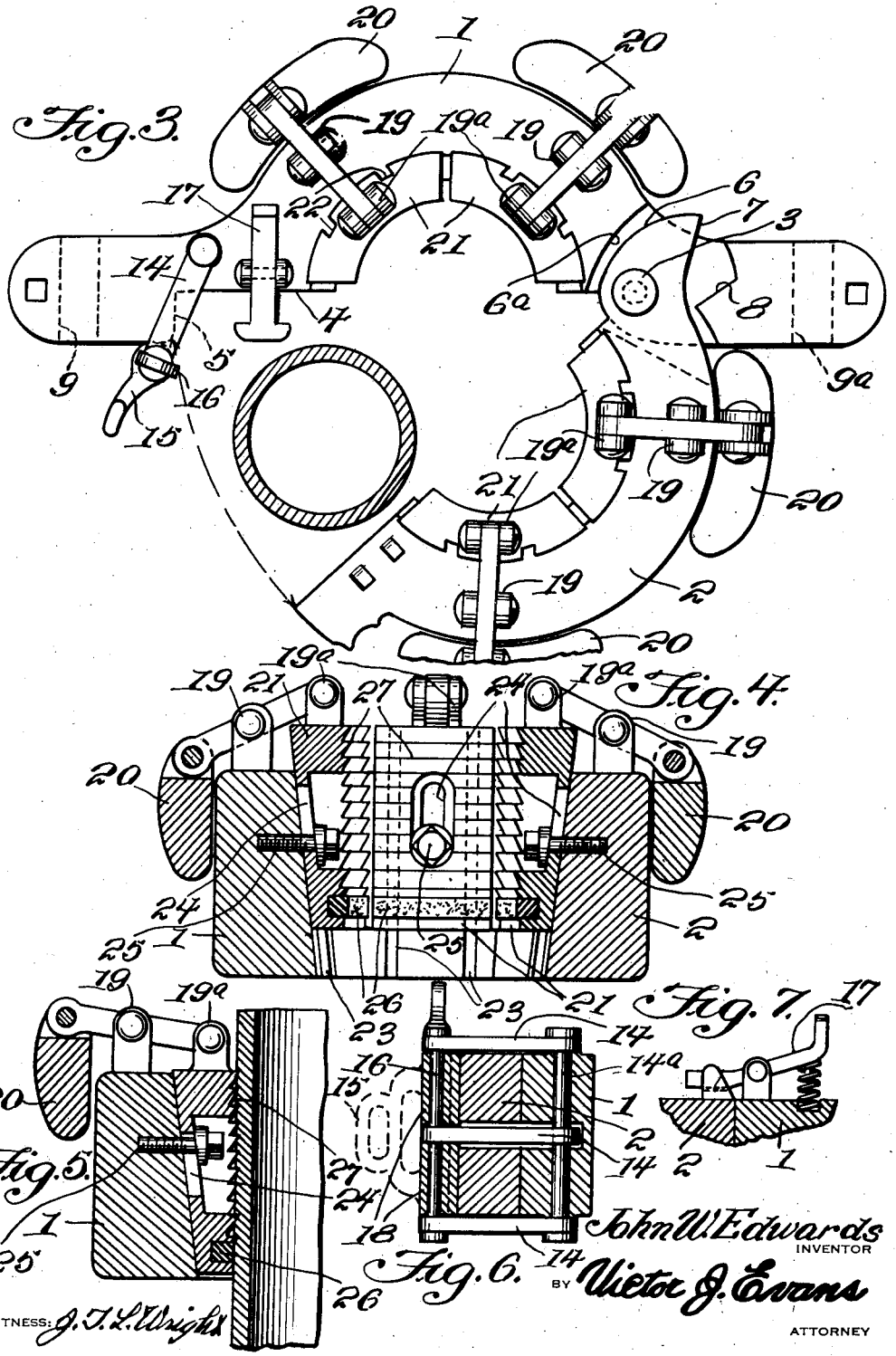

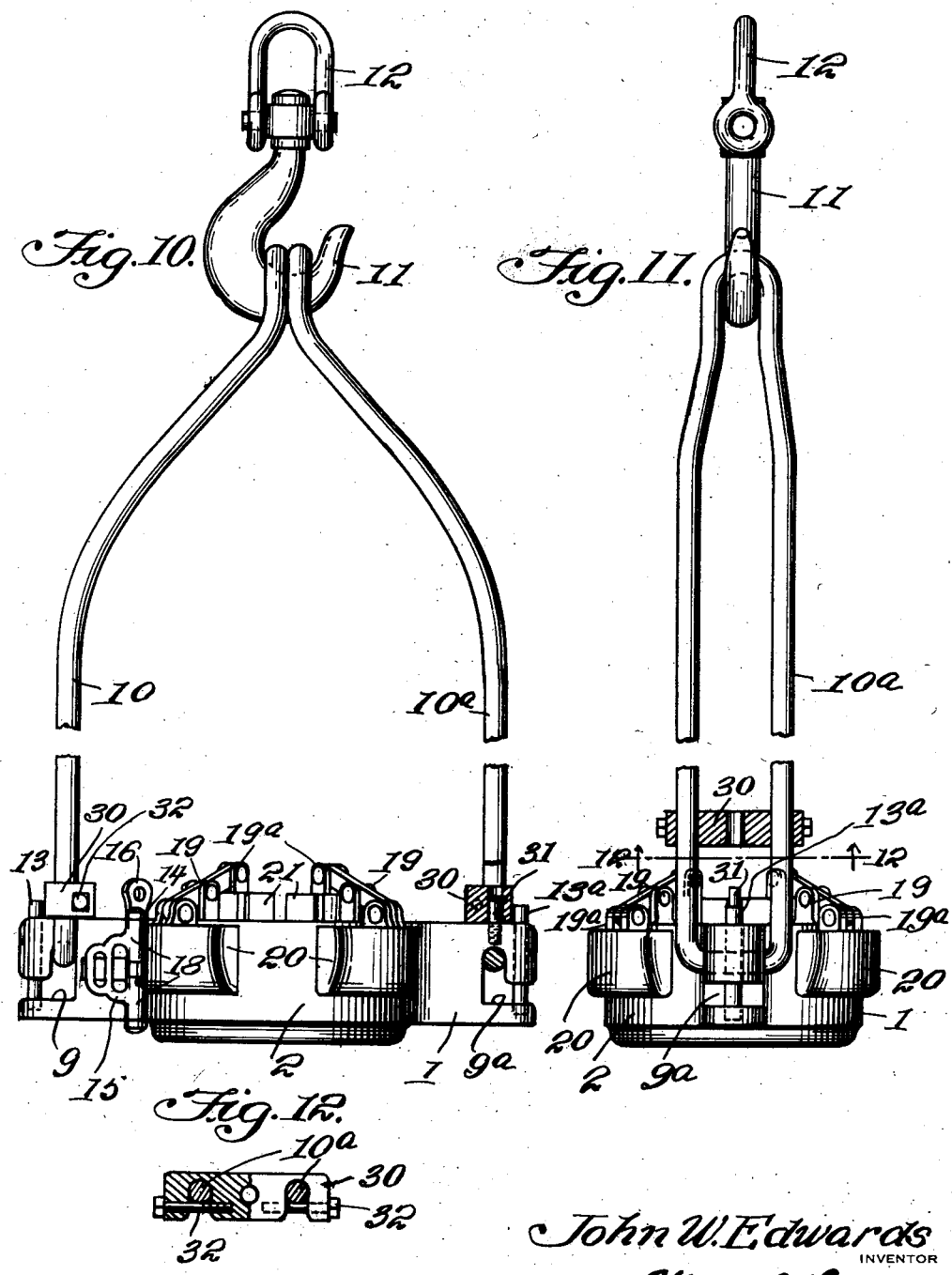

Patented Oct. 8, 1929

1,731,128

UNITED STATES PATENT OFFICE

JOHN W. EDWARDS, OF EUREKA, KANSAS

PIPE-LIFTING DEVICE

Application filed July 11, 1927. Serial No. 204,896.

This invention relates to an elevator for raising pipe lines in oil wells. In devices of this kind it is necessary to grip a line of metallic pipe in an oil well of variable depth but sometimes thousands of feet deep, the pipe line of which goes to the bottom from which the oil or other liquid is to be pumped out. Over such wells there is commonly provided a hoist for facilitating repairs and a cable is let down into gripping relation with the pipe line and the entire line lifted to facilitate repairs. For this purpose devices are provided with means for gripping the pipe and connecting with a cable by a bail so as to raise the pipe line. My invention is an improved device to carry out such ends. It comprises a pair of hinged supports with an annular supporting area and a converging or conical interior surface carrying in a right vertical plane a plurality of pivoted counterweighted jaws with interior gripping surfaces guided in the outer holder so that when the holder jaws are unlatched and opened they may be readily passed over the pipe line and when shifted together and latched come into contact with the pipe line, with the roughened edges of the jaws gripping the pipe with a force determined by the counterweights so that when the hoisting mechanism is applied the jaws will bite into the pipe with a bull dog grip and prevent any slipping when the dependent length of pipe is suspended.

My invention, therefore, comprises a hinged pipe elevator split on a diametrical line with taper annular supporting area and a plurality of counterweighted vertically moving pivoted jaws of cylindrical biting contour. It comprises also other features, the novelty of which will be hereinafter more fully described and will be definitely indicated in the appended claims.

In the accompanying drawing illustrating the invention:

Figure 1 is an elevation of a device embodying my improvements.

Figure 2 is a plan thereof.

Figure 3 is a view showing the device in position for work.

Figure 4 is a sectional view on the plane 4—4 of Figure 2.

Figure 5 is a part of sectional view showing the engagement of the jaws with the pipe line.

Figure 6 is a sectional view on the plane 6—6 of Figure 2.

Figure 7 is a sectional view on the plane 7—7 of Figure 2 across one of the latches.

Figures 8 and 9 are detached views showing the groove and tongue mounting of the jaws.

Figure 10 shows a view of the supporting hook to be connected with a hoisting cable and a bail supporting mechanism for my elevator.

Figure 11 is a view at right angles to that of Figure 10.

Figure 12 is a section on the plane 12—12 of Figure 11.

Referring now in detail to the drawings and first with reference to Figures 1 and 2, 1 and 2 represent a hinged holder pivotally supported on a bolt 3. These jaws when drawn together have meeting edges of an abutment 4 and an offset 5 in the outer member. At the pivotal locus of the separable members is an acute edge 6 and when the pivotal members are closed as indicated in Figure 2, the curved lip 7 bears against the vertical wall of a recess 8 in the companion member 1 and when drawn wide open the curved margin 6 of member 1 abuts against the correspondingly curved wall 6$^a$, thus the jaws when open are wide enough to admit any desired dimension of well pipe line. As shown in Figure 3, the jaws are open and a pipe of medium dimension is in process of being surrounded by the elevator.

The terminals of the hinged holder are recessed with a bayonet slot 9, 9$^a$ to admit a pair of heavy metallic bails 10, 10$^a$ adapted to be supported in a hook 11 pivoted to a yoke 12 adapted to be connected to a hoist. The slot of the bayonet joint, after insertion of the bail members, may be closed by lock pins 13, 13$^a$ dropped through an opening in the ends of the member 1 and socketed in a recess in the lower part of said ends. The free end of the member 2 carries a pivoted latch 14 composed of three sections (see Figure 6) pivoted on a bolt 14$^a$ adapted to swing over the edge of jaw 2, when a cam 18 will lie in the curved edge of member 2 and securely lock the separable members together. When the parts 1 and 2 are brought fully together an automatic spring-controlled latch 17 holds them together, when the latch 14 is shifted to the position shown in Figure 2, bringing the latch 14 over the edge of jaw 2 and by means of the cam handle 15 the cam tightly wedges the jaws 1 and 2 together.

The inner face of the supporting members 1, 2 is conical, as indicated in Figures 4 and 5, converging toward the bottom, and on posts 19, 19$^a$ is pivotally supported a plurality of counterweights 20 which may be masses of casting serving to lift a plurality of pendulous gripping jaws 21 (see Figure 2) which are provided with a pair of vertical grooves 22 cooperating with ribs 23 (see Figures 8 and 9) to give a true right line movement to the jaws. Each jaw is slotted, as indicated at 24 (see Figures 4 and 5) in which is a stud bolt 25 entering the wall of the member 1 through the slot 24. In the lower end of each sectional jaw 21 is a recess in which is interposed a square annular elastic washer of vulcanized rubber 26, which overlaps the walls of the circumferential teeth 27 formed on each arched inner surface of the jaw. It will be apparent from the construction hereinabove described that when the member is suspended on the hook 11 and locked into the bayonet supports, swinging of the members together will bring the parts into contact with the pipe line and as they are pushed together the latch 17 will automatically act to hold them together, when the handle 15 may be swung on its pivotal bolt bringing the latch element within the slot between the members and latching over the bolt 16, as will be apparent from inspection of Figures 1 and 2. Thus the parts are connected together against separation and in impinging into close relation, as indicated in Figure 2, the roughened jaws bite into the metal so that when the hoist is operated the sharp teeth prevent slipping and raise the counterweights 20, effecting a nonslippable clutching relation between the pipe line and the elevator. It is apparent, therefore, that I have provided a very effective means for lifting heavy circular objects such as long lines of piping in oil wells.

In order to prevent vibration and swaying of the clutch when assembling the jaws around a pipe line, I provide a removable yoke 30 at each side of the bail which may be applied over its rods, as indicated in Figure 12, and may be lowered on a pin 31 fixed in the face of the jaws. One of these will span each side of the bail and will prevent the jaws from wobbling.

While I have herein described the best mode of carrying out my invention which I have been so far able to design, I wish it to be understood that I am not limited by the specific means illustrated, but may use other equivalent forms without departing from the scope of my claims.

Having thus described my invention, what I claim as new and desire to secure by Letters Patent is:

1. An elevator for oil wells comprising a pair of bails detachably engaging a pair of hinged semi-annular members having conical inner walls, the hinged side of one member having a recess, a tongue on the other member to abut the recess, the free sides of the ends having walls to abut, a spring operated latch carried by one member to engage lugs on the other when closed, a pivoted lock member having horizontal arms at the top and bottom, a pivoted cam carried by one member having an operating handle attached, said cam being adapted to engage a recess in the other member, a plurality of sectional pivoted serrated gripping jaws slidable in the hinged members in sliding engagement thereto, and counterweights normally raising the several jaws in the vertical walls of the hinged members.

2. An elevator for oil wells, comprising a pair of hinged members having conical walls, a plurality of counterweighted gripping jaws slidably mounted therein, the inner faces of which are cylindrically serrated to grip a piping, and a pair of flat metallic loops adapted to engage a hoisting hook at the top, and bayonet catches at their bottom at the outside of the hinged members.

In testimony whereof I affix my signature.

JOHN W. EDWARDS.